United States Patent Office 2,844,088
Patented July 22, 1958

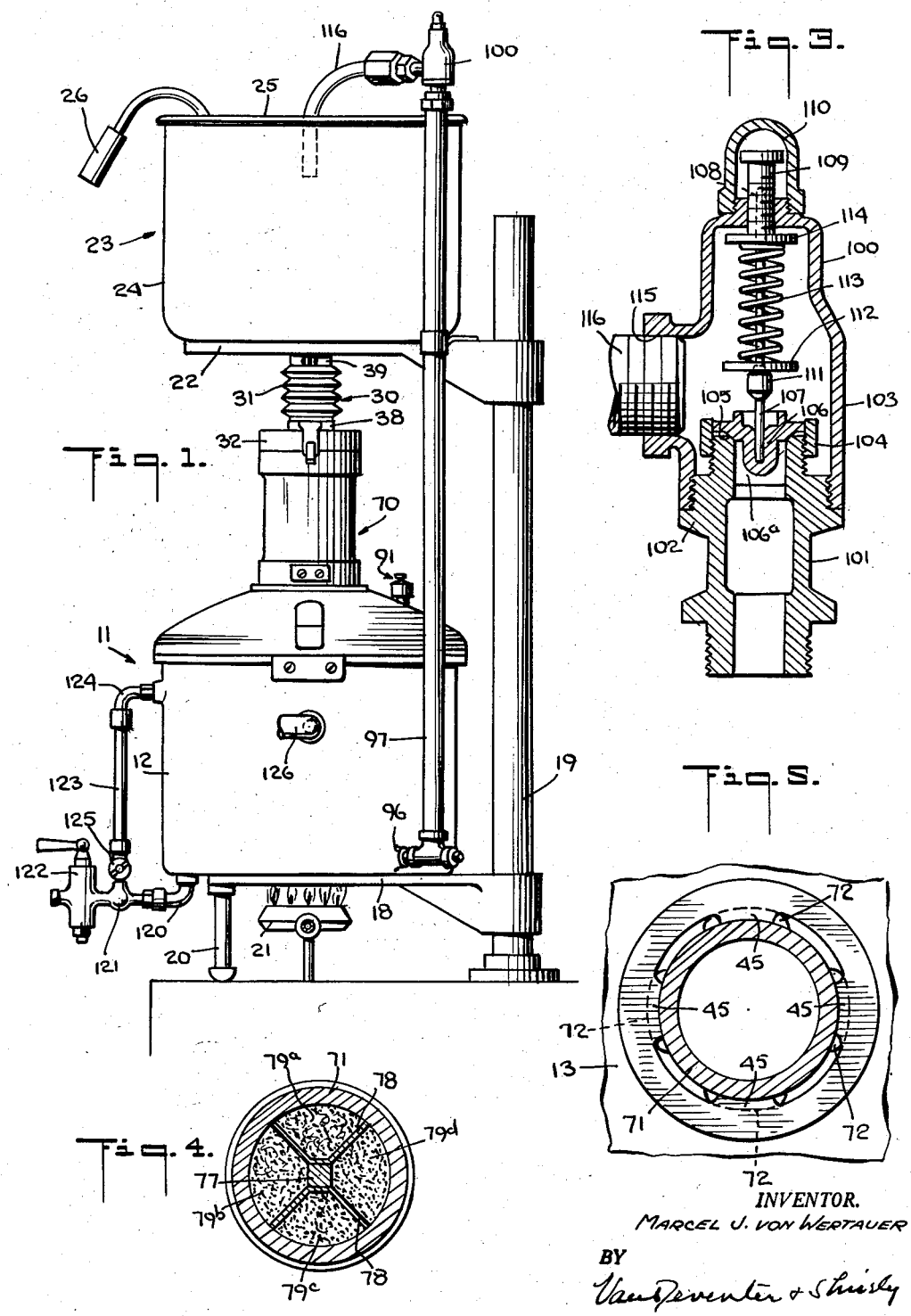

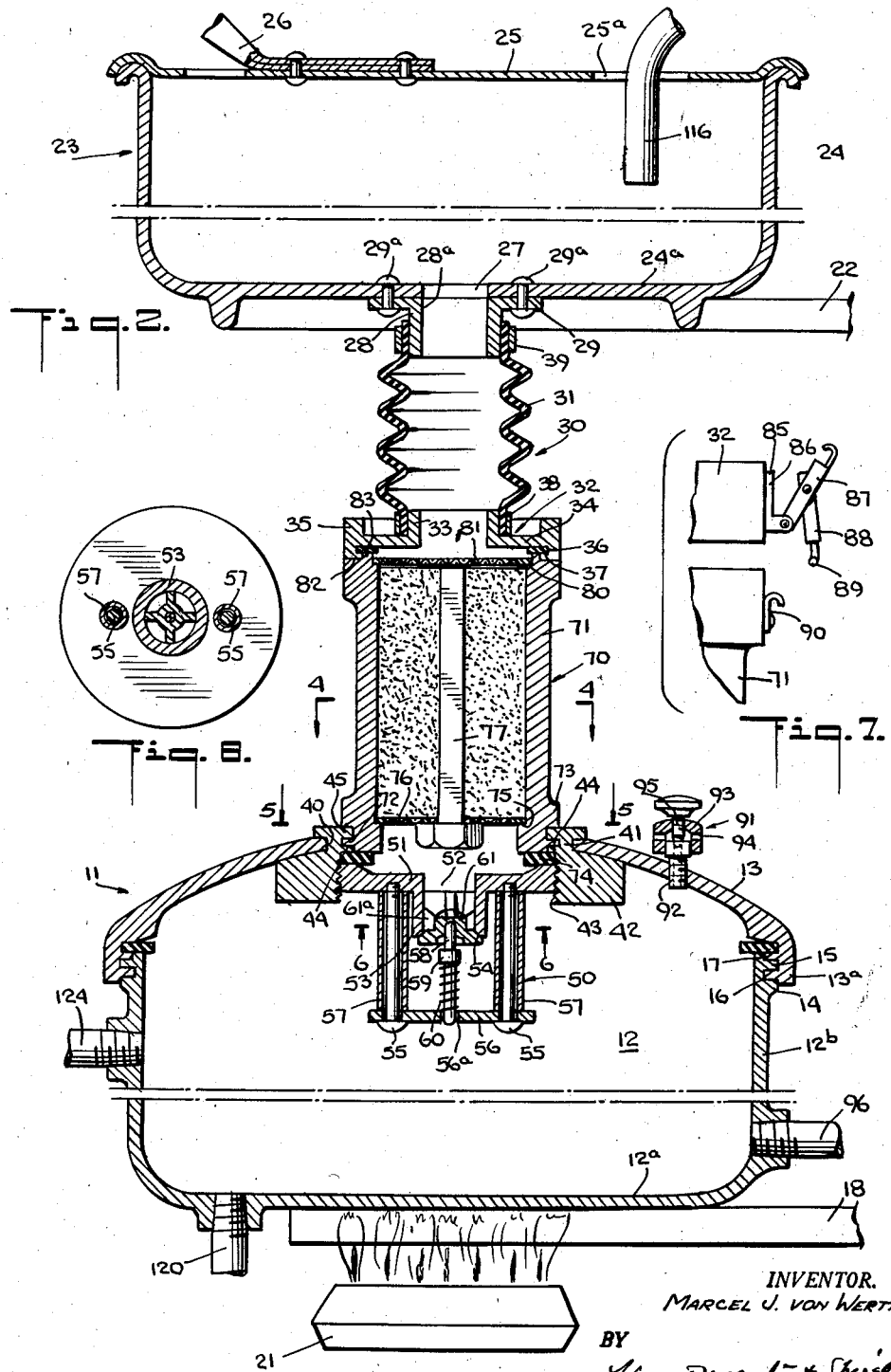

2,844,088
COFFEE PERCOLATOR
Marcel J. von Wertaur, New York, N. Y.
Application December 9, 1954, Serial No. 474,054
3 Claims. (Cl. 99—292)

The present invention relates to a coffee percolator and, more particularly, it relates to a coffee percolator of the vacuum type which is designed to handle large volumes of a coffee beverage.

The present application is a continuation-in-part of my pending application entitled "Coffee Percolators," filed August 29, 1952, Serial No. 306,998, which is a continuation-in-part of my pending application entitled "Coffee Percolator" filed October 11, 1950, Serial No. 189,585, now abandoned.

Heretofore, in restaurants, cafeterias and other food dispensing establishments where large volumes of coffee are dispensed daily, the coffee is prepared in a manner which is quite inefficient and uneconomical and which fails to yield the best tasting beverage. The coffee is prepared in a large urn which has at its top a large cloth straining or filtering bag adapted to contain roasted ground coffee. Boiling hot water is poured over the roasted coffee and the water then flows down through the filtering bag into a large reservoir located at the bottom of the urn.

In this method of making coffee, the roasted coffee floats around in the filtering bag as the hot water passes through the bag. This permits escape of the important volatile, aromatic compounds which give the coffee its excellent taste. Since the water also has oxygen in it, this oxygen will oxidize any aromatic compounds which do not escape so that the coffee takes on a bitter taste.

Moreover, no consideration is given in this procedure to attaining total or near total coffee extraction. The roasted coffee forms a bed of insufficient height for obtaining total extraction of the coffee thereby leaving about one third unextracted coffee in the coffee grinds. Where such a coffee urn is employed by a large restaurant or eating establishment, the amount of coffee wasted each year involves thousands of pounds. In addition, the filtering bag employed with this type of coffee urn is extremely difficult to clean so that the bitter aromatic compounds and oils are retained in the bag and contaminate the next batch of coffee.

I have found that the best tasting coffee is obtained if the volatile aromatics present in the ground coffee are preserved. This is achieved by conducting the extraction at temperatures ranging from approximately 195° F. down to 175° F. Where boiling water is employed, the volatile aromatics are destroyed by oxidation.

In order to prevent the liberation and destruction of the volatile aromatics, I have devised a coffee percolator of the vacuum type wherein the bed of roasted coffee is kept dry and free from any boiling water or hot steam and wherein the extraction takes place at temperatures less than 212° F.

Additionally, I have determined that for a complete extraction of the roasted coffee, it is desirable that the height of the bed of coffee to be extracted be three times as great as the diameter of the bed. Where the bed of coffee is too shallow, the contact time between the coffee grinds and the hot water is insufficient to extract completely the coffee solubles. This is particularly undesirable where a vacuum type coffee percolator is employed because the water passes through the bed only once. Thus, much of the coffee solubles are left in the bed. By employing a coffee bed having the desired 3:1 ratio in my coffee percolator, I am able to obtain practically complete coffee extraction.

I have also discovered that the coffee beverage will remain fresh for many hours, if the percolating water contains no oxygen during the extraction step. In my novel apparatus this is most easily accomplished since all oxygen in the water is removed when the heated water "flashes" into the feeding chamber.

In accord with my invention, I have provided a coffee percolator of the vacuum type comprising a pair of vertically spaced apart chambers having a percolation column located therebetween. The lower chamber, which I call the pressure chamber, serves as a reservoir and is adapted to contain a volume of water. The upper chamber, which I call the feeding chamber, serves to feed hot water to the percolation column. The lower end of the percolation column is connected to the top of the pressure chamber. The upper end of the percolation column is adapted to be connected to a flexible coupling leading from the bottom of the reservoir connection. Thus the chambers and the percolation column are in flow communication. A separate conduit extending from the pressure chamber to the feeding chamber serves to deliver water from the pressure chamber to the feeding chamber.

The percolation column is of such design that it is adapted to contain a bed of coffee wherein the height of the bed is three times as great as the diameter thereof. This is to insure sufficient contact time between the percolating water and the roasted coffee so as to obtain complete coffee extraction. Valve means are located adjacent the lower end of the percolation column. These valve means are normally closed so that when the water in the pressure chamber is being heated, steam cannot enter into the percolation column where the coffee is stored and liberate and destroy the volatile aromatics.

Accordingly, it is an object of the present invention to provide a coffee percolator of the vacuum type which is adapted for commercial use and which has a high efficiency due to its ability to extract completely the soluble coffee from roasted ground coffee.

It is a further object of the present invention to provide a coffee percolator of the vacuum type wherein the coffee is so made that it has a maximum stability enabling it to remain fresh for many hours after brewing.

Another object of the present invention is to provide a coffee percolator of the vacuum type which is simple to operate, attractive in appearance, and sturdy and durable in construction.

One advantage of my novel coffee percolator is that it affords maximum safety to the operator because there is no hazard from scalding due to pouring of the hot water into the top of the usual type of coffee urn.

Another advantage of my invention resides in the fact that it is sanitary and easy to clean and to inspect for cleanliness.

Still a further advantage of my invention is that 30% to 40% less coffee per batch is required than in the case of the present commercial type urns used in coffee making.

Yet another advantage resulting from my invention stems from the fact that the fine quality of the coffee is consistent. Each batch of coffee tastes as good as the previous batch.

Other objects and advantages of the present invention will become more apparent as it is described in detail below with particular reference to the accompanying drawings, wherein Figure 1 is a side view in elevation showing my novel coffee percolator;

Figure 2 is a broken vertical sectional view of my novel coffee percolator;

Figure 3 is an enlarged, detailed sectional view showing the pressure vapor valve used with my coffee percolator;

Figure 4 is a sectional view taken on lines 4—4 of Figure 2 and looking in the direction of the arrows;

Figure 5 is a sectional view taken on lines 5—5 of Figure 2 and looking in the direction of the arrows;

Figure 6 is a sectional view taken on lines 6—6 of Figure 2 and looking in the direction of the arrows; and Figure 7 is a fragmental view in elevation showing one of the locking means for locking the flexible coupling to the percolation column.

With particular reference to Figures 1 and 2, there is shown a pressure chamber 11 comprising a cylindrical body portion 12 open at its top and an outwardly curved lid 13 adapted to fit snugly over the cylindrical body portion. The body portion 12 of the pressure chamber 11 includes the flat base 12a and cylindrical side walls 12b extending upwardly from the flat base.

An outwardly extending rib 14 extends completely around the outer surface of the cylindrical walls 12b at a point slightly below the upper rim of the body portion 12. There is further disposed above the circumferential rib 14 but below the upper rim of the body portion 12, a plurality of regularly spaced apart and outwardly extending lugs 15. A circumferential rib 16 extends inwardly from the annular lip 13a which depends downwardly from the lid 13. The rib 16 has a plurality of space or cutaway portions which are adapted to register with the outwardly extending lugs 15 of the body portion 12. Located above the circumferential rib 16 but out of the registry with the cutaway portions of that rib are a plurality of lugs 17 which are adapted to engage and lie on top of corresponding lugs 15 when the lid 13 is locked to the body portion 12.

This manner of locking the lid 13 to the body portion 12 is well known in the art and is similar to the locking device found in the ordinary home pressure cooker. When it is desired to place the lid 13 into position on the body portion 12, the lid is rotated until the cutaway portions of the rib 16 are in registry with the lugs 15. At this point the lid 13 will drop downwardly so that the rib 16 lies on the rib 14. The lid 13 is then further rotated until the lugs 15 are out of registry with their corresponding cutaway portions in the rib 16 and in registry with the lugs 17 of the lid 13. The rib 16 then lies in snug fashion between rib 14 and lugs 15. The lid 13 is now in locked position. An annular gasket 11a is disposed on the upper rim of the body portion 12 so that when the lid 13 is locked to the body portion 12, the lid will bear down on the gasket 11a thereby sealing the pressure chamber 11 and making it air tight.

The pressure chamber 11 rests on a flat support member 18 which is permanently affixed to the upright stanchion 19. A pair of legs 20 are integrally fixed to the support member 18 and extend downwardly therefrom so that they will serve as feet for the support member 18. One such leg can be seen in Figure 1. Located underneath the support member 18 is a gas burner 21 which is connected to a suitable source of gas and which is adapted for heating water in the pressure chamber 11.

Disposed above the pressure chamber 11 and permanently affixed to the stanchion 19 is a second support member 22 which carries the feeding chamber 23. The feeding chamber 23 comprises the cylindrical body portion 24 open at its top and a flat removable lid 25 adapted to fit over the cylindrical body portion 24. The body portion 24 of the feeding chamber 23 includes the flat base 24a and the cylindrical side walls 24b extending upwardly therefrom. A handle 26 is connected to the top of the removable lid 25 to facilitate placement of the lid on the body portion 24. An orifice 27 is centrally located in the base 24a of the feeding chamber 23 and is in registry with the bore 28a of the neck portion 28 of the T-shaped member 29, which is permanently affixed to the undersurface of the base 24a of the feeding chamber 23 by means of rivets 29a.

Extending downwardly from the T-shaped member 29 is a flexible coupling 30 comprising a flexible tube 31 and an annular connection piece 32. The neck portion 28 of the T-shaped member 29 extends down into and is received within the upper end of the flexible tube 31. The upper end of the tube 31 is held in place on the T-shaped member 29 by the metal collar 39 which fits snugly around the tube 31 and neck portion 28 of the T-shaped member 29.

The connection piece 32 has a bored neck portion 33 which extends upwardly from its bored circular base 34. A vertical flange 35 extends around the circular base 34 both above and below the same and is integrally a part of the base 34. A circumferential groove 36 extends around the inner surface of the vertical flange 35 below the base 34 and is adapted to receive the gasket 37. The upper end of the neck portion 33 extends into and is received within the lower end of the flexible tube 31. A metal collar 38 fits tightly around the lower end of the flexible tube 31 so as to hold it in place around the neck portion 33.

The lid 13 has a centrally located orifice 40 which receives the sleeve 41. The sleeve 41 is permanently connected to the lid 13 and has a thickened depending portion 42 which extends down into the pressure chamber 11 and which is internally threaded as at 43. A rib 44 extends around the inner surface of the sleeve 41 above the threaded portion 43. A plurality of regularly spaced apart and inwardly extending lugs 45 are disposed on the sleeve 41 above the rib 44. The upper surfaces of these lugs 45 are level with the top of the sleeve 41.

A valve 50 is suspended from the sleeve 41 and is located within the pressure chamber 11. The valve 50 comprises an externally threaded plate 51 which is received within the internally threaded portion 43 of the sleeve 41. The plate 51 has a centrally located orifice 52. Depending downwardly from the rim of the orifice 52 and constituting an integral part of the plate 51 is the neck portion 53. The lower and inner edge of the neck portion 53 is bevelled to define a valve seat 54. A plurality of regularly spaced apart bolts 55 are threaded upwardly into the undersurface of the plate 51 and are adapted to carry on their heads a horizontal and circular plate 56, which lies below the neck portion 53. A cylindrical sleeve 57 is disposed around each bolt 55 and serves to keep the plate 56 firmly against the heads of the bolts 55 and to keep both plates 51 and 56 in spaced apart relation.

The plate 56 has a centrally located valve port 56a through which extends the valve stem 58. The valve port 56a is slightly wider than the valve stem 58 so that liquid can flow through the valve port and into the pressure chamber 11. A collar 59 is integrally affixed to the valve stem 58 and serves as a stop member for the spring 60 which surrounds the valve stem 58 below the collar 59. A valve plug 61 with attached spider 61a is carried on and permanently affixed to the valve stem 58 above the collar 59. The outer and upper edge of the valve plug 61 is bevelled so that it coacts with the bevelled edge of the valve seat 54. The lower end of the spring 60 rests on the plate 56 and is adapted to normally urge the valve stem 58 upwardly so that valve plug 61 normally seats in the valve seat 54.

The percolation column 70 of my novel coffee percolator comprises the cylindrical container 71 which is open at both ends. The lower end of the container 71 extends into and is received within the sleeve 41. A circumferential rib 72 extends around the outer surface of the container 71 slightly above the lower end thereof. The rib 72 has a plurality of cutaway portions adapted to register with and correspond to the lugs 45 on sleeve 41. Located above the circumferential rib 72 but out of registry with the cutaway portions of that rib are a plurality of lugs 73 which are adapted to engage and lie on top of corresponding lugs 45 when the container 71 is locked to the sleeve 41. It is thus seen that the cylinder 71 is locked to the sleeve 41 in the same manner as the lid 13 is locked to the body portion 12 of the pressure chamber 11. A gasket 74 is disposed between the lower end of the container 71 and the upper surface of the plate 51 so that the lower end of the container 71 will bear against the gasket 74 making the connection between container 71 and sleeve 41 an airtight one.

The inner surface of the lower end of the container 71 is thickened so as to form the annular shoulder 75, which shoulder is adapted to carry a circular fine mesh wire plate or wire screen 76. This wire screen 76 serves as a support for the bed of the coffee grinds within the percolation column 70. As best seen in Figures 2 and 4, a bolt 77 is permanently affixed to the wire screen 76 and extends upwardly therefrom to a point approximately near the top of the container 71. A pair of V-shaped and vertically extending partition members 78 are permanently affixed to the stem of the bolt 77. These partition members 78 are so shaped and located with respect to each other as to divide the inner bore of the container 71 into four separate and equal compartments 79a, 79b, 79c and 79d.

The inner surface of the upper end of the container 71 is recessed so as to define the annular shoulder 80, which is adapted to carry a circular wire plate or wire screen 81. This wire plate 81 is adapted to lie just above the top of the stem of the bolt 77. The outer surface of the upper end of the container 71 is also recessed so as to define the annular shoulder 82 which is adapted to coact with the lower end of the vertical flange 35 of the connecting piece 32. The annular shoulders 80 and 82 together define an annular rib 83 which tightly abuts the gasket 37 when the connection piece 32 is locked to the top of the container 71.

There is provided on opposite sides of the connection piece 32 a pair of fastening means 85 for locking the connection piece to the container 71. One such fastening means 85 is seen in Figure 7 where there is shown an L-shaped bracket 86 which is permanently connected to the connection piece 32. A lever 87 is pivotally connected at one end to the base of the L-shaped bracket 86. A second lever 88 is pivotally connected near one end to the mid-portion of the lever 87. The other end of the lever 88 carries a hook 89 adapted to connect with a correspondingly shaped hook 90 permanently fixed to the upper end of the container 71. When the hook 89 is connected to the stationary hook 90, the upper end of the lever 87 is pivoted toward the connection piece 32 thereby locking the lever 88 in place. When both fastening means 85 are closed, the connection piece 32 makes an airtight connection with the top end of the container 71 thereby preserving the airtight seal in the percolation column 70.

A safety valve 91 is located in the lid 13 of the pressure chamber 11. This safety valve 91 is of the conventional type and comprises a bored stem 92 extending into the pressure chamber 11. The bored stem 92 carries a hollow head piece 93 having radial ports 94 which are in communication with the bored stem 92. A very heavy valve stem 95 extends loosely through the top of the headpiece 93 and normally seals the valve end of the board stem 92. When pressure in the pressure chamber exceeds a predetermined amount, it will force the valve stem 95 upwardly permitting excess steam to escape from the pressure chamber through the radial ports 94.

Extending outwardly from the walls 12a at a point slightly above the base 12b is a pipe 96 which connects with the vertical riser pipe 97 which in turn leads to the feeding chamber 23. The upper end of the riser pipe 97 carries a pressure-vapor valve 100 which is seen in detail in Figure 3. This valve 100 comprises the sleeve 101 which is externally threaded at its lower end so that it can be screwed into the upper end of the riser pipe 97. The sleeve 101 has a thickened portion 102 near its upper end, which thickened portion 102 is externally threaded so that it can be received within the threaded lower end of the valve housing 103. The uppermost portion of the sleeve 101 is also externally threaded so that it can support the internally threaded collar 104. The inner edge of the upper rim of the sleeve 101 is bevelled so as to define a valve seat 105.

A valve plug 106 with attached spider 106a is located at the top of sleeve 101. The valve plug 106 is bevelled so that it sits tightly in the valve seat 105 of the sleeve 101. When the valve plug 106 is seated in its valve seat 105, the peripheral edges of the valve plug will lie closely within the collar 104. Extending upwardly from the valve plug 106 and permanently connected thereto is a valve stem 107 which is slidably received within the bore 108 of the sleeve 109 which is threaded to the top of the valve housing 103. A head casing 110 is connected to the top of the valve housing 103 and encloses the top of the sleeve 109. The valve stem 107 has a boss member 111 which serves as a stop member for the washer 112 carried on the valve stem 107 above the boss member 111. Supported on the washer 112 and encircling the valve stem 107 is a compression spring 113, the upper end of which engages a second washer 114, which also encircles the valve stem 107. The washer 114 is normally forced against the lower end of the sleeve 109 by the compression spring 113. At the same time, the compression spring 113 normally urges the washer 112 and, accordingly, the valve stem 107 downwardly so that the valve plug 106 is normally seated and the valve closed.

Extending horizontally and outwardly from the valve housing 103 is the port 115 which receives the end of curved pipe 116. The pipe 116 curves downwardly through orifice 25a in removable lid 25 of the feeding chamber 23 and terminates within the feeding chamber 23. Thus, it can be seen that there is flow communication between the pressure chamber 11, the riser pipe 97 and the feeding chamber 23.

Extending downwardly from base 12b of the pressure chamber 11 and leading from the pressure chamber is the elbow pipe 120 which is connected to one arm of the T-shaped pipe 121. The other arm of the T-shaped pipe 121 carries a conventional faucet member 122. A glass level tube 123 extends upwardly from the leg of the T-shaped pipe 121 and leads to the elbow pipe 124 that extends into the side walls 12a of the pressure chamber 11. A stopcock 125 is located in T-shaped pipe 121 for starting and stopping the flow of liquid to the glass tube 123. This arrangement is the usual measuring arrangement for determining amount of liquid within the pressure chamber 11. There is further shown a pipe 126 which leads from any suitable source of hot water to the pressure chamber 11 and which permits the user to initially fill the pressure chamber 11 with the hot water that is to be used to make the coffee beverage.

I have found that optimum extraction is achieved where the bed of ground coffee is contained in a percolation chamber where there is a fixed relation between the height and horizontal cross-sectional area of the chamber. Specifically, best extraction is obtained where the percolation chamber for containing the coffee defines a cylinder having a height three times greater than its diameter or where the chamber is equivalent to such a cylinder. The relation between height and horizontal cross-sectional area is expressed in the equation $$A = \frac{\pi H^2}{36}$$

where A represents the horizontal cross-sectional area of the chamber and H represents the height thereof.

This equation is derived in the following manner. In a cylindrical chamber having a height three times greater than its diameter, the relation therebetween is represented by the equation $$\frac{D}{H} = \frac{1}{3}$$

or $$D^2 = \frac{H^2}{9}$$

where D is the diameter and H is the height. The horizontal cross-sectional area of this cylindrical chamber is represented by the equation $$A = \frac{\pi D^2}{4}$$

where A is the horizontal cross-sectional area. Substituting $$\frac{H^2}{9}$$

for $D^2$ in this equation, there results the equation $$A = \frac{\pi H^2}{36}$$

When employing a percolation column adapted to contain large volumes of coffee, a relatively high column is required to maintain the fixed ratio. This type of column is impractical, however, because the percolating water will create a funnel or channel within the coffee bed if the column be too high. Thus the percolating water for the most part will seep through the central core of the coffee bed rather than pass uniformly through all parts. In order to overcome this difficulty, I provide a percolation column that is compartmented into a plurality of equal and elongated chambers wherein each chamber serves as a separated percolation column and wherein each chamber is equivalent to a cylindrical chamber having a height-diameter ratio of 3:1. In other words, each chamber has a relationship between its cross-sectional area and diameter which conforms with the equation $$A = \frac{\pi H^2}{36}$$

where A represents the horizontal cross-sectional area of the chamber and H represents its height. The compartments 79 in percolation column 70 are in accord with this equation.

In the operation of my novel coffee percolator, the compartments 79 are first completely filled with ground coffee and then the flexible coupling 30 is connected and locked to the top of the percolation column 70. A predetermined amount of water is brought into the pressure chamber 11 through pipe 126. The amount of water is measurable by observation of the level of liquid in glass tube 123. This water may be preheated for time saving purposes. Heat is then applied to the pressure chamber. When the pressure vapor in the sealed pressure chamber 11 is sufficient, the water in the pressure chamber will be forced upwardly through riser pipe 97 and flashed into feeding chamber 23. The pressure vapor valve 100 is opened by the upward surge of water in the riser pipe 97. After all of the water has passed into the feeding chamber 23, the pressure vapor valve 100 automatically closes thereby sealing the pressure chamber 11. The valve 50 has, of course, remained closed throughout this described operation. This prevents hot steam from entering the lower end of the percolation column 70 and destroying and liberating volatile aromatics in the coffee. The presence of trapped air in the coffee in the chambers 79 will prevent the immediate seepage of the hot water through the coffee thereby allowing the hot water further to cool below 212° F. This air will gradually bubble up through the water in the feeding chamber 23.

After the hot water has passed over into the feeding chamber 23, the heat is withdrawn from pressure chamber 11 thereby permitting the pressure chamber 11 to cool and to develop a vacuum within the pressure chamber. When this vacuum is sufficient, it will open valve 50 so that the hot water will percolate through the percolation column 70 and for the first time come into contact with the coffee to be extracted. The temperature of the percolating water will now range from 195° F. to 175° F. As stated above, this range is the best for optimum extraction of the coffee solubles. The important volatile aromatics contained in the ground coffee are brought into the pressure chamber 11 by the percolating water. Since the percolating water is at the proper extraction temperature, these aromatics are not destroyed or oxidized. When all of the hot water has percolated through the percolation column 70 and passed into pressure chamber 11, the valve 50 will automatically close thereby sealing the pressure chamber so that air from the atmosphere cannot enter the pressure chamber.

I have additionally found that the coffee beverage may retain its freshly prepared taste and quality for periods as long as 24 hours if the beverage is kept free from oxygen. Since the valve 50 is open only during percolation, oxygen from the atmosphere cannot enter the pressure chamber 11. Moreover, any oxygen originally present in the water or air in the pressure chamber 11 is removed when the hot water is flashed into feeding chamber 23. Since most of the air trapped in the coffee bed will eventually escape up through the water in the feeding chamber 23, it does not materially add oxygen to the coffee beverage. Thus, I am able with my novel coffee percolator to preserve the coffee in a substantially oxygen free manner so that the coffee beverage will have its fresh qaulity hours after preparation.

While my invention has been described in detail and shown with respect to the accompanying drawings, it is not to be limited to such details, since many changes and modifications may be made in the invention without departing from the spirit and scope thereof. Hence, it is desired to cover any and all forms and modifications of the invention which may come within the language and scope of any one or more of the appended claims.

I claim:

1. A coffee making apparatus comprising a pressure chamber adapted to be heated for retaining fluid under pressure, a feed chamber disposed in spaced relationship over said pressure chamber and having a central aperture in its bottom wall, a conduit secured adjacent the base of said pressure chamber and leading into the top of said feed chamber, an elongated container having ground coffee retaining screens as bottom and top walls removeably and hermetically secured to the top of said pressure chamber, a bellows conduit removeably and hermetically secured to the top of said container and about said aperture of said feed chamber, and vacuum operated check valve means secured within said pressure chamber hermetically below said bottom screen of said container.

2. The apparatus of claim 1 comprising a plurality of elongated walls disposed in said container forming a plurality of coffee containing compartments therein.

3. The apparatus of claim 2 comprising a spring-loaded check valve disposed in said conduit adjacent the top thereof.

References Cited in the file of this patent

UNITED STATES PATENTS

| | | |
|---|---|---|
| 191,106 | Busby | May 22, 1877 |
| 912,634 | Warburton | Feb. 16, 1909 |
| 1,549,840 | Lemoine | Aug. 18, 1925 |
| 1,830,000 | Miller et al. | Nov. 3, 1931 |
| 2,155,971 | Houseman | Apr. 25, 1939 |
| 2,210,126 | Risien et al. | Aug. 6, 1940 |
| 2,491,336 | Scherck | Dec. 13, 1949 |

FOREIGN PATENTS

| | | |
|---|---|---|
| 324,665 | France | Sept. 26, 1902 |
| 363,181 | France | Apr. 26, 1906 |
| 385,230 | France | Sept. 26, 1907 |
| 469,421 | France | May 20, 1914 |
| 552,286 | Feance | Jan. 18, 1923 |
| 432,419 | Great Britain | July 25, 1935 |
| 919,345 | France | Nov. 25, 1946 |
| 455,646 | Italy | Mar. 9, 1950 |